United States Patent
Kawasaki et al.

(10) Patent No.: US 11,571,770 B2
(45) Date of Patent: *Feb. 7, 2023

(54) SOLDER ALLOY, SOLDER PASTE, SOLDER BALL, SOLDER PREFORM, AND SOLDER JOINT

(71) Applicant: SENJU METAL INDUSTRY CO., LTD., Tokyo (JP)

(72) Inventors: Hiroyoshi Kawasaki, Tokyo (JP); Masato Shiratori, Tokyo (JP); Yuji Kawamata, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/295,354

(22) PCT Filed: May 15, 2020

(86) PCT No.: PCT/JP2020/019503
§ 371 (c)(1),
(2) Date: May 19, 2021

(87) PCT Pub. No.: WO2020/241319
PCT Pub. Date: Dec. 3, 2020

(65) Prior Publication Data
US 2022/0088721 A1 Mar. 24, 2022

(30) Foreign Application Priority Data
May 27, 2019 (JP) .............................. JP2019-098945

(51) Int. Cl.
*B23K 35/26* (2006.01)
*B23K 35/02* (2006.01)
(Continued)

(52) U.S. Cl.
CPC .......... *B23K 35/262* (2013.01); *B23K 35/025* (2013.01); *B23K 35/3093* (2013.01); *B23K 35/36* (2013.01); *C22C 13/00* (2013.01)

(58) Field of Classification Search
CPC ........................... B23K 35/262; B23K 35/025
(Continued)

(56) References Cited

U.S. PATENT DOCUMENTS 4,954,184 A 9/1990 Conn
5,215,602 A 6/1993 Ali et al.
(Continued)

FOREIGN PATENT DOCUMENTS

CN 1603056 A 4/2005
CN 103267834 A 4/2005
(Continued)

OTHER PUBLICATIONS

International Search Report for PCT/JP2020/019503, dated Aug. 4, 2020.
(Continued)

*Primary Examiner* — Weiping Zhu
(74) *Attorney, Agent, or Firm* — Nixon Peabody LLP; Jeffrey L. Costellia

(57) ABSTRACT

Provided are a solder alloy which has excellent temperature cycle characteristics and in which yellowish discoloration is suppressed, excellent wettability is maintained, and an increase in viscosity of a solder paste over time can be suppressed, and a solder paste, a solder ball, and a solder joint in which the solder alloy is used.
The solder alloy consists of, by mass %, 1.0% to 5.0% of Ag, 0.5% to 3.0% of Cu, 0.5% to 7.0% of Sb, 0.0040% to 0.025% of As, and a balance of Sn.

8 Claims, 1 Drawing Sheet

(51) Int. Cl.
*B23K 35/36* (2006.01)
*C22C 13/00* (2006.01)
*B23K 35/30* (2006.01)

(58) Field of Classification Search
USPC ........................................................ 420/557
See application file for complete search history.

(56) References Cited

U.S. PATENT DOCUMENTS

| | | | |
|---|---|---|---|
| 10,556,299 | B2 | 2/2020 | Yamasaki. et al. |
| 2004/0126270 | A1 | 7/2004 | Izumida et al. |
| 2015/0224604 | A1 | 8/2015 | Choudhury et al. |
| 2016/0158896 | A1 | 6/2016 | Koroki et al. |
| 2016/0158897 | A1 | 6/2016 | Koroki et al. |
| 2016/0271737 | A1 | 9/2016 | Ikeda et al. |
| 2016/0271738 | A1 | 9/2016 | Murphy et al. |
| 2016/0288271 | A1 | 10/2016 | Ikeda et al. |
| 2017/0252871 | A1 | 9/2017 | Kawasaki et al. |
| 2020/0376607 | A1* | 12/2020 | Kawasaki ............ B23K 35/025 |
| 2021/0245305 | A1 | 8/2021 | Kawasaki et al. |
| 2021/0308808 | A1 | 10/2021 | Kawasaki et al. |

FOREIGN PATENT DOCUMENTS

| | | | |
|---|---|---|---|
| CN | 1712175 | A | 12/2005 |
| CN | 101152686 | | 4/2008 |
| CN | 105431253 | A | 3/2016 |
| CN | 105829016 | A | 8/2016 |
| EP | 3 062 956 | | 9/2019 |
| JP | 49-038858 | | 4/1974 |
| JP | 05050286 | A * | 3/1993 |
| JP | 3027441 | | 4/2000 |
| JP | 2002-224881 | | 8/2002 |
| JP | 2002-224881 | A | 8/2002 |
| JP | 2002224881 | A * | 8/2002 |
| JP | 2006-181636 | A | 7/2006 |
| JP | 2006-181637 | A | 7/2006 |
| JP | 2006-212660 | A | 8/2006 |
| JP | 2008-030105 | A | 2/2008 |
| JP | 2013-049088 | A | 3/2013 |
| JP | 2013-126671 | A | 6/2013 |
| JP | 2013-237088 | A | 11/2013 |
| JP | 2013-237089 | A | 11/2013 |
| JP | 2013-237091 | A | 11/2013 |
| JP | 2014-069227 | | 4/2014 |
| JP | 2014-087814 | | 5/2014 |
| JP | 2015-020181 | A | 2/2015 |
| JP | 2015-020182 | | 2/2015 |
| JP | 2015-098052 | | 5/2015 |
| JP | 2015-098052 | A | 5/2015 |
| JP | 5807733 | | 11/2015 |
| JP | 5807733 | B1 | 11/2015 |
| JP | 2016-500578 | A | 1/2016 |
| JP | 2016-026882 | A | 2/2016 |
| JP | 2016-068105 | A | 5/2016 |
| JP | 2016-179496 | A | 10/2016 |
| JP | 2016-537206 | | 12/2016 |
| JP | 2016-537206 | A | 12/2016 |
| JP | 6322881 | B1 | 5/2018 |
| JP | 2018-136678 | A | 8/2018 |
| JP | 2018-167310 | A | 11/2018 |
| JP | 2020-011286 | A | 1/2020 |
| KR | 10-2016-0078379 | A | 7/2016 |
| WO | WO 03/020468 | A1 | 3/2003 |
| WO | WO 2007/029589 | A1 | 3/2007 |
| WO | WO 2010/113833 | A1 | 10/2010 |
| WO | WO2014/168027 | A1 | 10/2014 |
| WO | WO-2015-066155 | | 5/2015 |
| WO | WO2015/66155 | A1 | 5/2015 |
| WO | WO-2019-103025 | | 5/2019 |

OTHER PUBLICATIONS

International Search Report for International Application No. PCT/JP2019/046947 dated Mar. 3, 2020.
International Preliminary Report on Patentability (Chapter II) for International Application No. PCT/JP2019/046947 dated Jul. 13, 2020.
International Search Report and Written Opinion for International Application No. PCT/JP2019/020855 dated Aug. 27, 2019.
International Search Report and Written Opinion for International Application No. PCT/JP2019/020798 dated Aug. 27, 2019.
International Search Report and Written Opinion for International Application No. PCT/JP2019/041397 dated Jan. 21, 2020.
International Preliminary Report on Patentability for International Application No. PCT/JP2019/041397 dated Apr. 27, 2021.
Office Action for U.S. Appl. No. 17/261,558 dated Jun. 9, 2021 and claims pending as of Jun. 9, 2021.
Hasnine et al., Effect of Ge addition on wettability, copper dissolution, microstructural and mechanical behavior of SnCu—Ge solder alloy. J Mater Sci: Mater Electron. Jul. 17, 2017;28:16106-19. doi: 10.1007/s10854-017-7511-4.
Office Action for U.S. Appl. No. 17/261,557 dated Nov. 5, 2021 and claims pending as of Nov. 5, 2021.
Office Action for U.S. Appl. No. 17/261,558 dated Sep. 27, 2021 and claims pending as of Sep. 27, 2021.
[No Author Listed], RoHS-Richtiinien. Wikipedia. Oct. 6, 2021. https://de.wikipedia.org/w/index.php?file=RoHS-Richtlinien&oldid=173687369 [last accessed Oct. 3, 2021]. 11 pages.
Office Action for U.S. Appl. No. 17/261,557 dated Aug. 9, 2021 and claims pending as of Aug. 9, 2021.
Yamasumi, Examination of sample pretreatment method for quantification of added impurity elements in lead-free solder by ICP-AES. The Japan Society for Analytical Chemistry. Proceedings of the 50th Annual Meeting. Nov. 9, 2011:6. 3 pages.
International Search Report and Written Opinion for International Application No. PCT/JP2018/042943, dated Feb. 19, 2019.
International Preliminary Report on Patentability for International Application No. PCT/JP2018/042943, dated Jun. 4, 2020.
[No Author Listed] JIS Z 3282:2017 (JWES/JSA) Soft solders—Chemical compositions and forms. Japanese Industrial Standard. 2017. 36 pages.
[No Author Listed] Tin metal JIS H 2108-1996. Japanese Industrial Standard. Nov. 20, 1996, revised Feb. 20, 2009. 7 pages.
Office Action (U.S. Appl. No. 16/766,259) dated Sep. 3, 2021 (8 pages).
Notice of Allowance (U.S. Appl. No. 16/766,259) dated Mar. 9, 2022 (9 pages).
German Office Action in German App. No. 11 2020 000 278.0 dated Mar. 11, 2022 (7 pages).

* cited by examiner

SOLDER ALLOY, SOLDER PASTE, SOLDER BALL, SOLDER PREFORM, AND SOLDER JOINT

TECHNICAL FIELD

The present invention relates to a solder alloy, a solder paste, a solder ball, a solder preform, and a solder joint.

BACKGROUND ART

With the rapid development of electronic devices, many technological innovations have been made rapidly in various joining technologies, especially solder joining technologies, and highly appropriate solder materials have come to be used for each specific application. For example, materials such as materials suitable for thinning or fine granulation, materials having high strength, and materials exhibiting high corrosion resistance in a specific environment have been developed according to high-level specifications required each time. In particular, today's electronic devices tend to be large in size and the demand for reliability with respect to soldering is particularly strict. For this reason, advanced technology is also required for the development of materials.

Electronic devices requiring high density mounting are used in a strict atmosphere under the environmental conditions of the environment in space (artificial satellites such as communication satellites, meteorological satellites, and military satellites), the automobile environment, or the like. Such high density mounting is also required for electronic devices in which the occurrence of failures leads to serious accidents. In particular, if a solder joint that joins a printed substrate to an electronic component peels off even at one site, a function of an electronic device may not be able to be fulfilled due to lack of conduction, which may lead to a serious accident. Accordingly, in such electronic devices, it is necessary to use solder alloys that make it difficult for solder joints to peel off. For this reason, high reliability is required for soldering.

Incidentally, since there is no air, which is a heat medium, in outer space where artificial satellites fly, the temperature of artificial satellites becomes extremely high, for example, 125° C. when artificial satellites are directly exposed to sunlight, and on the other hand, the temperature of artificial satellites becomes low, for example, −40° C. when sunlight is blocked by the Earth. Moreover, this is repeated every time satellites orbit.

In this manner, artificial satellites are subjected to thermal fatigue when they are exposed to high- and low-temperature environments due to their orbiting. Therefore, it is necessary to use solders having excellent temperature cycle characteristics for electronic devices to be mounted on artificial satellites. If solder joints are subjected to thermal fatigue, thermal expansion and thermal contraction are repeated in not only solder alloys but also leads, printed substrates, or the like of soldered electronic components. With a solder sensitive to temperature cycles, cracks occur in the solder itself and solder joints may peel off.

In addition, in order to keep solder joints stable when artificial satellites are exposed to high temperatures, solders used for electronic devices of artificial satellites need to be high-melting-point solder alloys which do not melt even at a high temperature, for example, 150° C. and have characteristics such as strong adhesive strength at high temperatures.

In the related art, several high-melting-point solder alloys containing Sn as a main component have been proposed. For example, an Ag—Sb—Cu—Bi—Sn high-temperature solder for joining joints is disclosed in Patent Literature 1. This has been developed exclusively as an alternative to a Cd—Zn high-melting-point solder alloy in the related art. However, it is essential to add 0.5% to 2.0% of Bi to improve the tensile strength of the solder itself.

On the other hand, since the solder alloy contains Sn as a main component, if the surface of the solder alloy is oxidized, an SnO coating film, which is an oxide film, is formed, and the surface thereof turns yellow. The thicker the film thickness of the SnO coating film, the greater the yellowness of the surface of the solder. If the surface of a solder alloy turns yellow and loses its metallic luster, the solder alloy is not detected during automatic processing of image recognition of the solder alloy. Therefore, in some cases, a solder alloy that actually exists is not recognized.

Regarding solder materials of which yellowish discoloration of surfaces thereof is suppressed in the related art, Patent Literature 2 discloses, for example, a solder material, which is a sphere having a diameter of 1 to 1,000 μm, including: a solder layer consisting of a metallic material made of an alloy containing 40 mass % or more of Sn or a metallic material containing 100 mass % of Sn; and a coating layer that covers the surface of the solder layer, in which, in the coating layer, an SnO film is formed outside the solder layer and an $SnO_2$ film is formed outside the SnO film, and the thickness of the coating layer is greater than 0 nm and less than or equal to 4.5 nm. In the solder material. yellowish discoloration of the surface of the solder material is suppressed through formation of an $SnO_2$ film.

CITATION LIST

Patent Literature

[Patent Literature 1] Japanese Unexamined Patent Application, First Publication No. S49-38858
[Patent Literature 2] Japanese Patent No. 5807733
[Patent Literature 3] Japanese Patent No. 3027441

SUMMARY OF INVENTION

Technical Problem

However, it is simply required that it is difficult for the high-melting-point solder alloy containing Sn as a main component disclosed in Patent Literature 1 to melt at high temperatures and for it to have high temperature resistance, and no consideration is given to the temperature cycle characteristics. For this reason, the solder alloy disclosed in Patent Literature 1 generally contains Bi that makes a solder alloy hard and brittle. As an example of current specifications, characteristics of 500 or more cycles at −55° C. to 135° C. are required regarding temperature cycle characteristics under conditions more severe than those in the related art.

In addition to temperature cycle characteristics, the effect of suppressing yellowish discoloration of the surface of solder alloys is an important factor in the automatic processing of image recognition of solder alloys. However, since the solder material disclosed in Patent Literature 2 forms an $SnO_2$ film, high-energy plasma irradiation or the like is required, which complicates the production process. In addition, in order to suppress yellowish discoloration of the surface of the solder alloy containing Sn as a main component, elements such as P, Ge, and Ga are added thereto in the related art. These elements have a smaller oxide generation free energy than Sn and are very easily oxidized. Accordingly, when forming solder balls from molten solder, elements such as P, Ge, and Ga instead of Sn are oxidized and concentrated on the surface so that yellowish discoloration of the surface of solder can be suppressed.

However, in general, solder alloys are required to have wettability. However, if the content and the degree of the concentration of these elements are increased to suppress yellowish discoloration of the surface of solder alloys, the wettability of the solder alloys deteriorates.

Furthermore, in joining to and assembling of electronic components on substrates of electronic devices, soldering using a solder paste is advantageous in terms of costs and reliability. Coating of a substrate with a solder paste is performed, for example, through screen printing using a metal mask. In order to secure printability of a solder paste, it is necessary for the viscosity of the solder paste to be appropriate.

Here, in a case where a solder powder in which the yellowish discoloration is suppressed is used, it is possible to increase the content of an activator used in a solder paste or to use a highly active one in order to compensate for deterioration in the wettability. However, if the wettability is improved with an activator or the like, the viscosity of a solder paste increases over time. For this reason, in the solder alloy in the related art, it is impossible to have a thickening suppression effect when used in a solder paste at the same time as effects regarding temperature cycle characteristics and suppressing yellowish discoloration, and further studies are required.

The problem to be solved by the present invention is to provide a solder alloy which has excellent temperature cycle characteristics and in which yellowish discoloration is suppressed, excellent wettability is maintained, and an increase in viscosity of a solder paste over time can be suppressed, and a solder paste, a solder ball, a solder preform, and a solder joint in which the solder alloy is used.

Solution to Problem

The present inventors have focused on an Sn—Ag—Cu—Sb solder alloy in which Bi is omitted from the solder alloy disclosed in Patent Literature 1 to improve the temperature cycle characteristics by suppressing embrittlement of the solder alloy. This solder alloy is disclosed in Patent Literature 3 and is an excellent alloy of which the temperature cycle characteristics significantly improve with addition of a predetermined amount of Ag, Cu, and Sb.

Here, Patent Literature 3 discloses that, since the temperature cycle characteristics deteriorate with addition of other metals, other metals are not added except those incorporated as impurities. That is, it is thought that other elements cannot be included in an Sn—Ag—Cu—Sb solder alloy to improve the temperature cycle characteristics.

The present inventors have attempted to intentionally add a trace amount of As from various elements to an Sn—Ag—Cu—Sb solder alloy as an element that suppresses yellowish discoloration. From the disclosure of Patent Literature 3, it would be thought that the temperature cycle characteristics deteriorate with the addition of As to this solder alloy. In addition, a solder alloy containing Sn as a main component is known to form an $SnO_2$ film as described above, and a solder alloy containing As is usually considered to be inferior in wettability. Therefore, addition of As to a solder alloy has been avoided. However, unexpectedly, the present inventors have found that, in an Sn—Ag—Cu—Sb—As solder alloy containing As, the temperature cycle characteristics shown are excellent, an As-concentrated layer is formed on the surface of the solder alloy which suppresses yellowish discoloration and an excellent thickening suppression effect is obtained, and high wettability is maintained, and have completed the present invention.

The present invention obtained from these findings is as follows.

(1) A solder alloy consisting of, by mass %, 1.0% to 5.0% of Ag, 0.5% to 3.0% of Cu, 0.5% to 7.0% of Sb, 0.0040% to 0.025% of As, and a balance of Sn, the solder alloy including: an As-concentrated layer, in which the presence of the As-concentrated layer is confirmed by determination criteria below, the As-concentrated layer is a region from an outermost surface of the solder alloy to a depth of 2×D1 (nm) in terms of $SiO_2$, and a thickness of the As-concentrated layer in terms of $SiO_2$ is 0.5 to 8.0 nm.

(Determination Criteria)

In a sample having a size of 5.0 mm×5.0 mm, an arbitrary area of 700 μm×300 μm is selected, and XPS analysis is performed in combination with ion sputtering. One area is selected for each sample, and each of three samples is analyzed once, for a total of three analyses. In a case where S1>S2 in all of the three analyses, it is determined that an As-concentrated layer has been formed.

Here,

S1: Integrated value of a detection intensity of As in a region from a depth of 0 to 2×D1 (nm) in terms of $SiO_2$ in a chart of XPS analysis S2: Integrated value of a detection intensity of As in a region from a depth of 2×D1 to 4×D1 (nm) in terms of $SiO_2$ in a chart of XPS analysis D1: Initial depth (nm) in terms of $SiO_2$ at which a detection intensity of O atoms is ½ a maximum detection intensity (intensity at Do·max) in portion deeper than the depth (Do·max (nm)) in terms of $SiO_2$ at which a detection intensity of O atoms is a maximum in a chart of XPS analysis (2) A solder paste including: a solder powder consisting of the solder alloy according to the above-described (1); and a flux.

(3) A solder ball consisting of the solder alloy according to the above-described (1).

(4) A solder preform consisting of the solder alloy according to the above-described (1).

(5) A solder joint made of the solder alloy according to the above-described (1).

DESCRIPTION OF EMBODIMENTS

Figure 1:
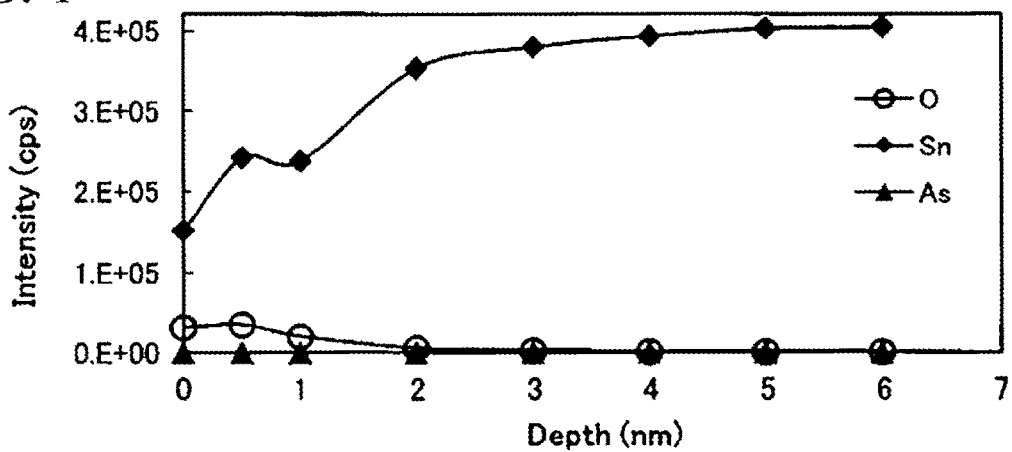
FIG. 1 is a chart of XPS analysis of a surface of a solder ball.

The present invention will be described in more detail below. In the present specification, "%" relating to a solder alloy composition is "mass %" unless otherwise specified.

1. Solder Alloy (1) Ag: 1.0% to 5.0%

Although Ag is significantly effective in improving the temperature cycle characteristics, if the content of Ag is less than or equal to 1.0%, the effect of improving the temperature cycle characteristics is not sufficient. The lower limit of the content of Ag is greater than or equal to 1.0%, preferably greater than or equal to 1.2%, more preferably greater than or equal to 2.5%, and still more preferably greater than or equal to 3.0%.

On the other hand, if the content of Ag is greater than 5.0%, the liquidus temperature increases. Therefore, soldering has to be performed at high temperature, which causes thermal damage to electronic components or printed substrates. The upper limit of the content of Ag is less than or equal to 5.0%, more preferably less than or equal to 4.0%, still more preferably less than or equal to 3.9%, and still more preferably less than or equal to 3.4%.

(2) Cu: 0.5% to 3.0%

If a small amount of Cu is added to a solder alloy which has Sn as a main component and to which a small amount of Ag is added, the temperature cycle characteristics further improve due to a synergistic action with Ag. If the content of Cu is smaller than 0.5%, the effect does not appear. The lower limit of the content of Cu is greater than or equal to 0.5% and preferably greater than or equal to 0.6%.

On the other hand, if the content of Cu is greater than 3.0%, the liquidus temperature rises sharply. Therefore, similarly to the addition of a large amount of Ag, the increased temperature of soldering causes thermal damage to electronic components or printed substrates. In addition, a large amount of Sn—Cu intermetallic compounds is generated, a matrix becomes sandy, and the temperature cycle characteristics rather deteriorate. The upper limit of the content of Cu is less than or equal to 3.0%, preferably less than or equal to 2.0%, more preferably less than or equal to 1.0%, and still more preferably less than or equal to 0.7%.

(3) Sb: 0.5% to 7.0%

In the present invention, the temperature cycle characteristics can be significantly improved simply by adding a small amount of Ag, Cu, and Sb to a main component of Sn.

If the content of Sb is smaller than 0.5%, there is no effect of improving the temperature cycle characteristics. The lower limit of the content of Sb is greater than or equal to 0.5%, preferably greater than or equal to 1.0%, and more preferably greater than or equal to 2.0%. On the other hand, if the content of Sb is greater than 7.0%, the wettability of a solder alloy deteriorates. The upper limit of the content of Sb is less than or equal to 7.0%, preferably less than or equal to 6.0%, more preferably less than or equal to 5.0%, still more preferably less than or equal to 4.0%, and particularly preferably less than or equal to 3.0%.

(4) As: 0.0040% to 0.025%

Since As forms an As-concentrated layer on the surface of a solder alloy, the yellowish discoloration is suppressed. In addition, if the solder alloy according to the present invention is added to a solder paste as a solder powder, the thickening suppression effect can be exhibited. The content of As needs to be greater than or equal to 0.0040% with regard to a lower limit thereof in order for the effects due to inclusion of As to be exhibited sufficiently. On the other hand, if the content of As is greater than 0.025%, the wettability deteriorates. The upper limit of the content of As is less than or equal to 0.025%, preferably less than or equal to 0.020%, and more preferably less than or equal to 0.010%.

The As-concentrated layer formed due to incorporation of As in the present invention is a region in which the concentration of As is higher than the average concentration (proportion of the mass of As in the mass of a solder alloy) of As in a solder material, and is specifically a region from the outermost surface of a solder alloy to a depth of 2×D1 (nm) in terms of $SiO_2$. The presence of the As-concentrated layer can be confirmed by determination criteria described below. The As-concentrated layer is preferably present on at least a part of the surface side of a solder alloy and preferably covers the entire surface.

If an As-concentrated layer is formed due to incorporation of As, the yellowish discoloration is suppressed and high wettability is maintained. Although the reason why an increase in the viscosity of a solder paste can be suppressed is unclear, it is inferred to be as follows.

It is thought that the increase in the viscosity is caused by formation of salts due to a reaction caused between Sn or an Sn oxide and various additives such as an activator contained in a solder paste (flux) or coagulation of a solder powder. It is inferred that, if an As-concentrated layer is present on the surface of the solder alloy according to the present invention, the As-concentrated layer is interposed between a solder powder and a flux, and the above-described reaction is unlikely to occur, and therefore, the above-described effects are simultaneously exhibited.

(4-1) Determination Criteria of As-Concentrated Layer

In a sample having a size of 5.0 mm×5.0 mm (in a case where a solder material is not plate-shaped, one obtained by spreading a solder material (such as a solder powder or a solder ball) without any gaps over a range of 5.0 mm×5.0 mm), an arbitrary area of 700 μm×300×μm is selected, and XPS analysis is performed in combination with ion sputtering. One area is selected for each sample, and each of three samples is analyzed once, for a total of three analyses. In a case where S1≥S2 in all of the three analyses, it is determined that an As-concentrated layer has been formed.

Here, the definition of S1, S2, and D1 is as follows.

S1: Integrated value of a detection intensity of As in a region from a depth of 0 to 2×D1 (nm) in terms of $SiO_2$ in a chart of XPS analysis performed on the above-described sample S2: Integrated value of a detection intensity of As in a region at a depth of 2×D1 to 4×D1 (nm) in terms of $SiO_2$ in a chart of XPS analysis D1: Initial depth (nm) in terms of $SiO_2$ at which a detection intensity of O atoms is ½ a maximum detection intensity (intensity at Do·max) in portion deeper than the depth (Do·max (nm)) in terms of $SiO_2$ at which a detection intensity of O atoms is a maximum The detailed conditions of the above-described determination criteria of the As-concentrated layer are as described in examples. By having an As-concentrated layer on the surface of the solder alloy according to the present invention, the yellowish discoloration of the solder alloy can be suppressed and the increase in the viscosity of a solder paste can be suppressed.

(4-2) Thickness of As-Concentrated Layer

The thickness (in terms of $SiO_2$) of an As-concentrated layer is 0.5 to 8.0 nm, more preferably 0.5 to 4.0 nm, and most preferably 0.5 to 2.0 nm. If the thickness of an As-concentrated layer is within the above-described ranges, a solder material of which the yellowish discoloration is suppressed and which has excellent wettability is obtained.

(4-3) Yellowness

In the present invention, yellow b* in the L*a*b* color system of a solder alloy is preferably 0 to 10.0, more preferably 3.0 to 5.7, and most preferably 3.0 to 5.0. If the yellowness b* in the L*a*b* color system of a solder material is within the above-described ranges, the yellowness is low and the solder has metallic luster. Therefore, a solder joint is accurately detected during automatic processing of image recognition of the solder joint.

In the present invention, the yellowness b* can be obtained from color values (L*, a*, and b*) by measuring spectral transmittance according to "Methods of Color Measurement-Color of Reflecting and Transmitting Objects" of JIS Z 8722 with a light source D65 and a 10-degree field of view using a CM-3500d2600d-type spectrocolorimeter (manufactured by Konica Minolta, Inc.)

(5) Balance: Sn

The balance of the solder alloy according to the present invention is preferably Sn. The solder alloy may contain unavoidable impurities in addition to the above-described elements. The inclusion of unavoidable impurities does not affect the above-described effects. In addition, even if elements which have not been contained in the present invention are contained as unavoidable impurities as will be described below, the above-described effect is not affected.

(6) Bi and Pb

The solder alloy according to the present invention may not contain Bi because Bi is an element that makes the solder alloy hard and brittle. Since the amount of Pb used as a designated hazardous substance contained in electronic and electrical apparatuses is restricted by the Restriction of Hazardous Substance (RoHS) Directive in Europe, Pb may not be included.

2. Solder Paste

The solder paste according to the present invention contains a flux and a solder powder.

(1) Component of Flux

A flux used in the solder paste is composed of any one or a combination of two or more of an organic acid, an amine, an amine hydrohalide, an organic halogen compound, a thixotropic agent, rosin, a solvent, a surfactant, a base agent, a polymer compound, a silane coupling agent, and a colorant.

Examples of organic acids include succinic acid, glutaric acid, adipic acid, pimelic acid, suberic acid, azelaic acid, sebacic acid, dimer acids, propionic acid, 2,2-bishydroxymethylpropionic acid, tartaric acid, malic acid, glycolic acid, diglycolic acid, thioglycolic acid, dithioglycolic acid, stearic acid, 12-hydroxystearic acid, palmitic acid, and oleic acid.

Examples of amines include ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine-isocyanuric acid adduct, a 2-phenylimidazole-isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine-isocyanuric acid adduct, 2,4-diamino-6-methacryloyloxyethyl-s-triazine, an epoxy-imidazole adduct, 2-methylbenzimidazole, 2-octylbenzimidazole, 2-pentylbenzimidazole, 2-(1-ethylpentyl)-benzimidazole, 2-nonylbenzimidazole, 2-(4-thiazolyl) benzimidazole, benzimidazole, 2-(2'-hydroxy-5'-methylphenyl) benzotriazole, 2-(2'-hydroxy-3'-tert-butyl-5'-methylphenyl)-5-chlorobenzotriazole, 2-(2'-hydroxy-3',5'-di-tert-amylphenyl) benzotriazole, 2-(2'-hydroxy-5'-tert-octylphenyl) benzotriazole, 2,2'-methylenebis[6-(2H-benzotriazole-2-yl)-4-tert-octylphenyl], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl) aminomethyl] benzotriazole, carboxybenzotriazole, 1-[N,N-bis(2-ethylhexyl) aminomethyl] methylbenzotriazole, 2,2'-[[(methyl-1H-benzotriazole-1-yl) methyl] imino]bisethanol, 1-(1',2'-dicarboxyethyl) benzotriazole, 1-(2,3-dicarboxypropyl) benzotriazole, 1-[(2-ethylhexyl amino)methyl] benzotriazole, 2,6-bis[(1H-benzimidazole-1-yl) methyl]-4-methylphenol, 5-methylbenzotriazole, and 5-phenyltetrazole.

An amine hydrohalide is a compound obtained by reacting an amine and a hydrogen halide, and examples of amines include ethylamine, ethylenediamine, triethylamine, diphenylguanidine, ditolylguanidine, methylimidazole, and 2-ethyl-4-methylimidazole, and examples of hydrogen halides include hydrides of chlorine, bromine, and iodine.

Examples of organic halogen compounds include trans-2,3-dibromo-2-butene-1,4-diol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

Examples of thixotropic agents include a wax-based thixotropic agent, an amide-based thixotropic agent, and a sorbitol-based thixotropic agent. Examples of wax-based thixotropic agents include hydrogenated castor oil. Examples of amide-based thixotropic agents include a monoamide-based thixotropic agent, a bisamide-based thixotropic agent, and a polyamide-based thixotropic agent, and specific examples thereof include lauric acid amide, palmitic acid amide, stearic acid amide, behenic acid amide, hydroxystearic acid amide, saturated fatty acid amides, oleic acid amide, erucic acid amide, unsaturated fatty acid amides, p-toluene methane amide, aromatic amide, methylenebisstearic acid amide, ethylenebislauric acid amide, ethylenebishydroxystearic acid amide, saturated fatty acid bisamide, methylenebisoleic acid amide, unsaturated fatty acid bisamide, m-xylylenebisstearic acid amide, aromatic bisamide, saturated fatty acid polyamide, unsaturated fatty acid polyamide, aromatic polyamide, substituted amides, methylol stearic acid amide, methylol amide, and fatty acid ester amides. Examples of sorbitol-based thixotropic agents include dibenzylidene-D-sorbitol and bis(4-methylbenzylidene)-D-sorbitol.

Examples of base agents include nonionic surfactants, weak cationic surfactants, and rosin.

Examples of nonionic surfactants include polyethylene glycol, a polyethylene glycol-polypropylene glycol copolymer, an aliphatic alcohol-polyoxyethylene adduct, an aromatic alcohol-polyoxyethylene adduct, and a polyhydric alcohol-polyoxyethylene adduct.

Examples of weak cationic surfactants include terminal diamine polyethylene glycol, a terminal diamine polyethylene glycol-polypropylene glycol copolymer, an aliphatic amine-polyoxyethylene adduct, an aromatic amine-polyoxyethylene adduct, and a polyvalent amine-polyoxyethylene adduct.

Examples of rosin include raw rosin such as gum rosin, wood rosin, and tall oil rosin, and derivatives obtained from the raw rosin. Examples of the derivatives include purified rosin, hydrogenated rosin, disproportionated rosin, polymerized rosin, an α,β-unsaturated carboxylic acid-modified product (such as acrylated rosin, maleated rosin, or fumarated rosin), a purified product, a hydride, and a disproportionated product of the polymerized rosin, and a purified product, a hydride, and a disproportionated product of α,β-unsaturated carboxylic acid-modified products, and two or more kinds thereof can be used. In addition to a rosin resin, the flux can further contain at least one resin selected from a terpene resin, a modified terpene resin, a terpene phenol resin, a modified terpene phenol resin, a styrene resin, a modified styrene resin, a xylene resin, and a modified xylene resin. An aromatic modified terpene resin, a hydrogenated terpene resin, a hydrogenated aromatic modified terpene resin, or the like can be used as a modified terpene resin. A hydrogenated terpene phenol resin or the like can be used as a modified terpene phenol resin. A styrene-acrylic resin, a styrene-maleic acid resin, or the like can be used as a modified styrene resin. Examples of modified xylene resins include a phenol-modified xylene resin, an alkylphenol-modified xylene resin, a phenol-modified resol-type xylene resin, a polyol-modified xylene resin, and a polyoxyethylene-added xylene resin.

Examples of solvents include water, an alcoholic solvent, a glycol ether-based solvent, and terpineols. Examples of alcoholic solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexane dimethanol, erythritol, threitol, guaiacol glycerol ether, 3,6-dimethyl-4-octyne-3,6-diol, and 2,4,7,9-tetramethyl-5-decyne-4,7-diol. Examples of glycol ether-based solvents include diethylene glycol mono-2-ethylhexyl ether, ethylene glycol monophenyl ether, 2-methylpentane-2,4-diol, diethylene glycol monohexyl ether, diethylene glycol dibutyl ether, and triethylene glycol monobutyl ether.

Examples of surfactants include polyoxyalkylene acetylene glycols, polyoxyalkylene glyceryl ether, polyoxyalkylene alkyl ether, polyoxyalkylene ester, polyoxyalkylene alkylamine, and polyoxyalkylene alkylamide.

(2) Content of Flux

The content of a flux based on the total mass of a solder paste is preferably 5% to 95% and more preferably 5% to 15%. Within these ranges, the thickening suppression effect due to a solder powder is sufficiently exhibited.

(3) Solder Powder

A solder powder used in the solder paste according to the present invention is preferably a spherical powder. The spherical solder powder improves the fluidity of solder alloys.

In addition, in the case where the solder alloy is spherical powders which have sizes (grain size distribution) corresponding to Symbols 1 to 8 in the classification (Table 2) of the powder size in JIS Z 3284-1:2014, soldering on fine parts can be performed. Particulate solder materials more preferably have sizes corresponding to Symbols 4 to 8 and even more preferably have sizes corresponding to Symbols 5 to 8. The sphericity thereof is preferably greater than or equal to 0.90, more preferably greater than or equal to 0.95, and most preferably greater than or equal to 0.99.

In the present invention, the spherical diameter and the sphericity of a solder alloy which is a spherical powder is measured with a CNC image measurement system (Ultra Quick Vision ULTRA QV350-PRO Measurement Device manufactured by Mitutoyo Corporation) in which minimum zone center method (MZC method) is used. In the embodiment, the sphericity represents deviation from a true sphere and is an arithmetic average value calculated when, for example, diameters of 500 balls are divided by major axes. As the value is closer to 1.00 which is the upper limit, the balls are closer to true spheres.

(4) Method for Producing Solder Paste

The solder paste according to the present invention is produced through a method common in the art. First, well-known methods such as a dropping method in which a molten solder material is added dropwise to obtain particles, a spraying method in which the molten solder material is centrifugally sprayed, and a method in which a bulk solder material is pulverized can be employed for the production of a solder powder. In the dropping method or the spraying method, dropping or spraying is preferably performed in an inert atmosphere or a solvent in order to form particles. The above-described components can be heated and mixed with each other to prepare a flux, the above-described solder powder can be introduced into the flux, and the mixture can be stirred and mixed to produce a solder paste.

3. Solder Ball

The solder alloy according to the present invention can be used as a solder ball. In the case where the solder alloy according to the present invention is used as a solder ball, a solder ball can be produced through a dropping method which is a method common in the art. In addition, a solder joint can be produced by processing a solder ball through a method common in the art, for example, through joining of the solder ball by mounting the solder ball on one electrode coated with a flux. The particle diameter of a solder ball is preferably greater than or equal to 1 μm, more preferably greater than or equal to 10 μm, still more preferably greater than or equal to 20 μm, and particularly preferably greater than or equal to 30 μm. The upper limit of the particle diameter of a solder ball is preferably less than or equal to 3,000 μm, more preferably less than or equal to 1,000 μm, still more preferably less than or equal to 600 μm, and particularly preferably less than or equal to 300 μm.

4. Solder Preform

The solder alloy according to the present invention can be used as a solder preform. Examples of the shape of a preform include washers, rings, pellets, discs, ribbons, and wires.

5. Solder Joint

The solder alloy according to the present invention can be used as a joint for joining two or more various members. The joining members are not limited and are useful as, for example, joints for electronic devices. That is, the solder joint according to the present invention is a connection portion of an electrode and can be formed using general soldering conditions.

6. Method for Forming Solder Alloy

A method for producing the solder alloy according to the present invention is not limited and can be produced by melting and mixing raw materials.

A method for forming an As-concentrated layer in a solder alloy is also not limited. Examples of the method for forming an As-concentrated layer include heating of a solder material in an oxidation atmosphere (air or oxygen atmosphere). The heating temperature is not limited, but can be set to 40° C. to 200° C., and may be 50° C. to 80° C. The heating time is also not limited, and can be set to several minutes to several days and preferably several minutes to several hours. In order to form a sufficient amount of an As-concentrated layer, the heating time is preferably longer than or equal to 10 minutes and more preferably longer than or equal to 20 minutes. By subjecting the above-described solder powder, solder ball, and solder preform to, for example, this heat treatment, an As-concentrated layer is formed.

A low α-ray material can be used as a raw material of the solder alloy according to the present invention to produce a low α-ray alloy. If such a low α-ray alloy is used to form solder bumps around a memory, soft errors can be suppressed.

EXAMPLES

A solder powder consisting of each solder alloy (mass %) of Tables 1 and 2 and a flux shown in Table 3 were heated and stirred so that the mass ratio (flux:solder powder) of the flux to the solder powder becomes 11:89, and were then cooled to produce a solder paste. This solder paste was used to evaluate 1. Temperature Cycle Characteristics, 2. Presence or Absence of As-concentrated layer, and 3. Suppression of Thickening. In addition, the solder ball consisting of each solder alloy of Tables 1 and 2 was used to evaluate 4. Yellowish Discoloration and 5. Solder Wettability.

The solder powders used in these examples were obtained by heating solder powders which have an average particle diameter of 21 μm and correspond to "5" in the classification (Table 2) of the powder size in JIS Z3284-1:2014 for 30 minutes at 60° C. with a dryer in atmospheric air. Solder powders which have not been subjected to heat treatment were used only in Comparative Examples 11 to 13.

1. Temperature Cycle Characteristics

A printed substrate was coated with each solder paste produced as described above, various electronic components were placed thereon, and then, soldering of the printed substrate and the electronic components was performed in a reflow furnace. A thermal shock test was conducted in which the printed substrate soldered in this manner was placed in an environment of −55° C. and +130° C. repeatedly for 30 minutes each. The number of cycles in which the number of cracks generated was greater than or equal to 10% was counted, and printed substrates having 500 or more cycles scored ◯.

2. Presence or Absence of As-Concentrated Layer

The presence or absence of an As-concentrated layer was evaluated as follows using depth direction analysis through X-ray photoelectron spectroscopy (XPS).

(Analysis Conditions)

Analyzer: Micro-region X-ray photoelectron spectroscopic analyzer (AXIS Nova manufactured by Kratos Analytical Limited)

Analysis condition: X-Ray source being AlKa line, X-ray gun voltage being 15 kV, X-ray gun current value being 10 mA, and analysis area being 700 μm×300 μm Sputtering conditions: Ion type being Ar+, accelerating voltage being 2 kV, sputtering rate being 0.5 nm/min (in terms of $SiO_2$)

Samples: Three samples obtained by flatly spreading each solder powder having the alloy composition shown in Tables 1 and 2 without any gap on a stage to which carbon tape was stuck were prepared as samples. However, the sizes of the samples were set to 5.0 mm×5.0 mm. These solder powders were ones used when producing the above-described solder pastes.

(Evaluation Procedure)

An arbitrary area of 700 μm×300 μm was selected from each sample having a size of 5.0 mm×5.0 mm, and XPS analysis was performed on each of Sn, O, and As atoms while performing ion sputtering to obtain an XPS analysis chart. One area was selected for each sample, and each of three samples was analyzed once, for a total of three analyses.

Figure 2:
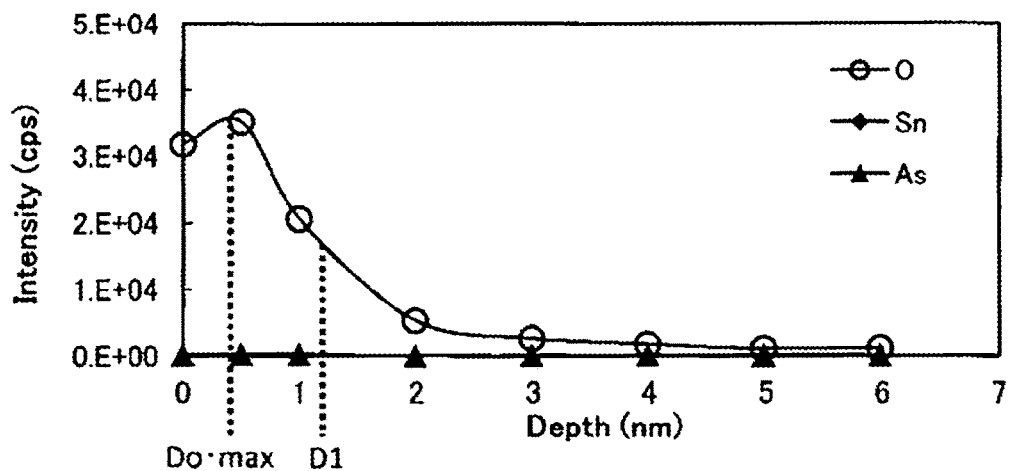
FIG. 2 is a chart of XPS analysis of a surface of a solder ball.
Figure 3:
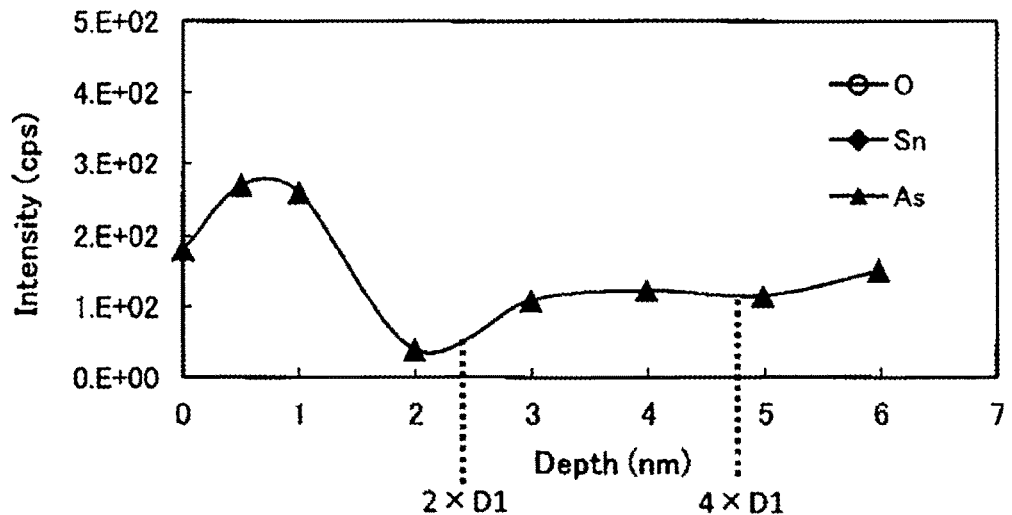
FIG. 3 is a chart of XPS analysis of a surface of a solder ball.

Examples of charts obtained from the XPS analysis are shown in FIGS. 1 to 3. FIGS. 1 to 3 are charts in which the scale of the detection intensity (cps) on the vertical axis is changed for an identical sample, and the horizontal axis is the depth (nm) in terms of $SiO_2$ calculated from the sputtering time. In the XPS analysis charts, the vertical axis is the detection intensity (cps). Although the horizontal axis can be selected from either the sputtering time (min) or the depth (nm) in terms of $SiO_2$ calculated from the sputtering time using a sputter-etching rate of an $SiO_2$ standard sample, the horizontal axis in the XPS analysis charts in FIGS. 1 to 3 is the depth (nm) in terms of $SiO_2$ calculated from the sputtering time using a sputter-etching rate of an $SiO_2$ standard sample.

Moreover, in the XPS analysis chart of each sample, the depth in terms of $SiO_2$ at which the detection intensity of an O atom was maximum was set to Do·max (nm) (refer to FIG. 2). Moreover, the initial depth in terms of $SiO_2$ at which the detection intensity of an O atom was ½ maximum detection intensity (intensity at Do·max) in a portion deeper than Do·max was set to D1 (nm).

Subsequently, in the XPS analysis chart of each sample, an integrated value (S1) of the detection intensity of As in a region (region where the depth in terms of $SiO_2$ was 0 to 2×D1) from the outermost surface to the depth 2×D1 and an integrated value (S2) of the detection intensity of As in a region (region where the depth in terms of $SiO_2$ was 2×D1 to 4×D1 (nm)) from the depth 2×D1 to a portion deeper by 2×D1 were obtained (refer to FIG. 3) and were compared from each other.

Then, an evaluation was performed based on the following criteria.

S1>S2 at all three times of measurement: As-Concentrated layer is formed: (◯)

S1>S2 at two more less times out of all three times of measurement: No As-concentrated layer is formed: (×)

3. Suppression of Thickening

The viscosity of the solder pastes used in the above-described "1. Temperature Cycle Characteristics" was measured for 12 hours at a rotation frequency of 10 rpm and a measurement temperature of 25° C. using a rotational viscometer (PCU-205 manufactured by Malcolm Co., Ltd.) according to the method described in "4.2 Test for Viscosity Characteristics" of JIS Z 3284-3:2014. The initial viscosity (viscosity after 30 minutes of stirring) was compared with a viscosity after 12 hours to evaluate the thickening suppression effect based on the following criteria.

Viscosity after 12 hours≤initial viscosity×1.2: Favorable due to small increase in viscosity over time: (◯)

Viscosity after 12 hours>initial viscosity×1.2: Failure due to large increase in viscosity over time: (×)

4. Yellowish Discoloration

The solder balls (with a spherical diameter of 0.3 mm) having the alloy compositions shown in Tables 1 and 2 were heated for 30 minutes at 60° C. using a dryer in atmospheric air and then heated for 2 hours in a constant-temperature tank at 200° C. in an air atmosphere. The yellowness b* of the solder balls in the L*a*b* color system before and after heating was measured, and the amount of increase (Δb*) obtained by subtracting b* before heating from b* after heating was calculated.

The yellowness b* was obtained from color values (L*, a*, and b*) by measuring spectral transmittance according to "Methods of Color Measurement-Color of Reflecting and Transmitting Objects" of JIS Z 8722:2009 with a light source D65 and a 10-degree field of view using a CM-3500d2600d-type spectrocolorimeter (manufactured by Konica Minolta, Inc.) The color values (L*, a*, and b*) are based on the standard of JIS Z 8781-4:2013.

The value Δb* is less than or equal to 50% of Δb* (reference): ◉ (Very good)

The value Δb* is greater than 50% and less than or equal to 70% of Δb* (reference): ○ (Good)

The value Δb* is greater than 70% of Δb* (reference): × (Poor)

5. Solder Wettability

Flux WF-6400 (manufactured by Senju Metal Industry Co., Ltd.) was printed on a Bare-Cu (bare copper) electrode pad (opening diameter (solder resist opening) of an electrode provided on a substrate: 0.24 mm) so as to have a thickness of 0.115 mm, and each solder ball used in "4. Yellowish Discoloration" was mounted thereon. The temperature of the electrode pad on which each solder ball was mounted was increased from 25° C. to 250° C. at a rate of temperature increase of 1° C./sec and was subsequently increased to 280° C. at a rate of temperature increase of 3° C./sec in a N2 atmosphere for reflowing. After the reflowing, the electrode pad on which each solder ball was mounted was immersed in distilled water and ultrasonically washed for 1 minute. The number of bumps (number of missing bumps) that had disappeared in the washing step without being soldered was counted to conduct an evaluation based on the following criteria.

The number of missing bumps in 100 bumps is 0: ◉ (Very good)

The number of missing bumps in 100 bumps is 1 to 5: ○ (Good)

The number of missing bumps in 100 bumps is 6: × (Poor)

6. Comprehensive Evaluation

In a case where all of the above-described tests scored "○" or "◉", it was evaluated as "○". In a case where any one of the tests scored "×", it was evaluated as "×".

The results are shown in Tables 1 and 2.

TABLE 1

| | Sn | Ag | Cu | Sb | As | Other elements | Temperature cycle characteristics | Presence and absence of As-concentrated layer | Evaluation of thickening | Yellowish discoloration | Solder wettability | Comprehensive evaluation |
|---|---|---|---|---|---|---|---|---|---|---|---|---|
| Example 1 | Bal. | 1.000 | 1.000 | 3000 | 0.004 | — | ○ | ○ | ○ | ○ | ◉ | ○ |
| Example 2 | Bal. | 1.000 | 1.000 | 3.000 | 0.010 | — | ○ | ○ | ○ | ◉ | ◉ | ○ |
| Example 3 | Bal. | 1.000 | 1.000 | 3.000 | 0.020 | — | ○ | ○ | ○ | ◉ | ◉ | ○ |
| Example 4 | Bal. | 1.000 | 1.000 | 3.000 | 0.025 | — | ○ | ○ | ○ | ◉ | ○ | ○ |
| Example 5 | Bal. | 1.200 | 0.500 | 3.000 | 0.004 | — | ○ | ○ | ○ | ○ | ◉ | ○ |
| Example 6 | Bal. | 1.200 | 0.500 | 3.000 | 0.010 | — | ○ | ○ | ○ | ◉ | ◉ | ○ |
| Example 7 | Bal. | 1.200 | 0.500 | 3.000 | 0.020 | — | ○ | ○ | ○ | ◉ | ◉ | ○ |
| Example 8 | Bal. | 1.200 | 0.500 | 3.000 | 0.025 | — | ○ | ○ | ○ | ◉ | ○ | ○ |
| Example 9 | Bal. | 2.500 | 0.500 | 3.000 | 0.004 | — | ○ | ○ | ○ | ○ | ◉ | ○ |
| Example 10 | Bal. | 2.500 | 0.500 | 3.000 | 0.010 | — | ○ | ○ | ○ | ◉ | ◉ | ○ |
| Example 11 | Bal. | 2.500 | 0.500 | 3.000 | 0.020 | — | ○ | ○ | ○ | ◉ | ◉ | ○ |
| Example 12 | Bal. | 2.500 | 0 500 | 3.000 | 0.025 | — | ○ | ○ | ○ | ◉ | ○ | ○ |
| Example 13 | Bal. | 2.500 | 0.700 | 3.000 | 0.004 | — | ○ | ○ | ○ | ○ | ◉ | ○ |
| Example 14 | Bal. | 2.500 | 0.700 | 3.000 | 0.010 | — | ○ | ○ | ○ | ◉ | ◉ | ○ |
| Example 15 | Bal. | 2.500 | 0.700 | 3.000 | 0.020 | — | ○ | ○ | ○ | ◉ | ◉ | ○ |
| Example 16 | Bal | 2 500 | 0700 | 3 000 | 0.025 | — | ○ | ○ | ○ | ◉ | ○ | ○ |
| Example 17 | Bal. | 3.000 | 0.500 | 1.000 | 0.004 | — | ○ | ○ | ○ | ○ | ◉ | ○ |
| Example 18 | Bal. | 3.000 | 0.500 | 1.000 | 0.010 | — | ○ | ○ | ○ | ◉ | ◉ | ○ |
| Example 19 | Bal. | 3.000 | 0.500 | 1.000 | 0.020 | — | ○ | ○ | ○ | ◉ | ◉ | ○ |
| Example 20 | Bal. | 3.000 | 0.500 | 1.000 | 0.025 | — | ○ | ○ | ○ | ◉ | ○ | ○ |
| Example 21 | Bal. | 3.400 | 1.000 | 2.000 | 0.004 | — | ○ | ○ | ○ | ○ | ◉ | ○ |
| Example 22 | Bal. | 3.400 | 1.000 | 2.000 | 0.010 | — | ○ | ○ | ○ | ◉ | ◉ | ○ |
| Example 23 | Bal. | 3.400 | 1.000 | 2.000 | 0.020 | — | ○ | ○ | ○ | ◉ | ◉ | ○ |
| Example 24 | Bal. | 3.400 | 1.000 | 2.000 | 0.025 | — | ○ | ○ | ○ | ◉ | ○ | ○ |
| Example 25 | Bal. | 3.900 | 0.600 | 3.000 | 0.004 | — | ○ | ○ | ○ | ○ | ◉ | ○ |
| Example 26 | Bal. | 3.900 | 0.600 | 3.000 | 0.010 | — | ○ | ○ | ○ | ◉ | ◉ | ○ |
| Example 27 | Bal. | 3.900 | 0.600 | 3.000 | 0.020 | — | ○ | ○ | ○ | ◉ | ◉ | ○ |
| Example 28 | Bal. | 3.900 | 0 600 | 3.000 | 0.025 | — | ○ | ○ | ○ | ◉ | ○ | ○ |
| Example 29 | Bal. | 3.000 | 0.500 | 3.000 | 0.004 | — | ○ | ○ | ○ | ○ | ◉ | ○ |
| Example 30 | Bal. | 3.000 | 0.500 | 3.000 | 0.010 | — | ○ | ○ | ○ | ◉ | ◉ | ○ |
| Example 31 | Bal. | 3.000 | 0.500 | 3.000 | 0.020 | — | ○ | ○ | ○ | ◉ | ◉ | ○ |
| Example 32 | Bal. | 3.000 | 0.500 | 3.000 | 0.025 | — | ○ | ○ | ○ | ◉ | ○ | ○ |
| Example 33 | Bal. | 3.000 | 0.600 | 7.000 | 0.004 | — | ○ | ○ | ○ | ○ | ◉ | ○ |
| Example 34 | Bal. | 3.000 | 0.600 | 7.000 | 0.010 | — | ○ | ○ | ○ | ◉ | ◉ | ○ |
| Example 35 | Bal. | 3.000 | 0.600 | 7.000 | 0.020 | — | ○ | ○ | ○ | ◉ | ◉ | ○ |
| Example 36 | Bal. | 3.000 | 0.600 | 7.000 | 0.025 | — | ○ | ○ | ○ | ◉ | ○ | ○ |
| Example 37 | Bal. | 4.000 | 0.500 | 3.000 | 0.004 | — | ○ | ○ | ○ | ○ | ◉ | ○ |
| Example 38 | Bal. | 4.000 | 0.500 | 3.000 | 0.010 | — | ○ | ○ | ○ | ◉ | ◉ | ○ |
| Example 39 | Bal. | 4.000 | 0.500 | 3.000 | 0.020 | — | ○ | ○ | ○ | ◉ | ◉ | ○ |
| Example 40 | Bal. | 4.000 | 0.500 | 3.000 | 0.025 | — | ○ | ○ | ○ | ◉ | ○ | ○ |
| Example 41 | Bal. | 5.000 | 3.000 | 3.000 | 0.004 | — | ○ | ○ | ○ | ○ | ◉ | ○ |

TABLE 2

| | Sn | Ag | Cu | Sb | As | Other elements | Temperature cycle characteristics | Presence and absence of As-concentrated layer | Evaluation of thickening | Yellowish discoloration | Solder wettability | Comprehensive evaluation |
|---|---|---|---|---|---|---|---|---|---|---|---|---|
| Example 42 | Bal. | 5.000 | 3.000 | 3.000 | 0.010 | — | ○ | ○ | ○ | ◎ | ◎ | ○ |
| Example 43 | Bal. | 5.000 | 3.000 | 3.000 | 0.020 | — | ○ | ○ | ○ | ◎ | ◎ | ○ |
| Example 44 | Bal. | 5.000 | 3.000 | 3.000 | 0.025 | — | ○ | ○ | ○ | ◎ | ○ | ○ |
| Com. Ex. 1 | Bal. | 3.500 | 1.000 | 4.000 | — | Bi: 0.5 | X | — | X | X | ○ | X |
| Com. Ex. 2 | Bal. | 4.000 | 1.500 | 0.500 | — | Pb: 14 | X | — | X | X | ○ | X |
| Com. Ex. 3 | Bal. | 0.500 | 4.000 | — | — | — | X | — | X | X | ○ | X |
| Com. Ex. 4 | Bal. | 0.500 | 4.000 | — | 0.010 | — | X | ○ | X | ◎ | ◎ | X |
| Com. Ex. 5 | Bal. | 0.500 | 4.000 | — | 0.025 | — | X | ○ | X | ◎ | ◎ | X |
| Com. Ex. 6 | Bal. | 3.000 | 0.500 | — | — | — | ○ | — | X | X | ○ | X |
| Com. Ex. 7 | Bal. | 3.000 | 0.500 | — | 0.002 | — | ○ | X | X | X | ○ | X |
| Com. Ex. 8 | Bal. | 3.000 | 0.500 | — | 0.050 | — | ○ | ○ | ○ | ◎ | X | X |
| Com. Ex. 9 | Bal. | 3.900 | 0.600 | 3.000 | 0.002 | — | ○ | X | X | X | ○ | X |
| Com. Ex. 10 | Bal. | 3.900 | 0.600 | 3.000 | 0.050 | — | ○ | ○ | ○ | ◎ | X | X |
| Com. Ex. 11 | Bal. | 3.900 | 0.600 | 3.000 | 0.004 | — | ○ | X | X | X | ○ | X |
| Com. Ex. 12 | Bal. | 3.400 | 1.000 | 2.000 | 0.004 | — | ○ | X | X | X | ○ | X |
| Com. Ex. 13 | Bal. | 4.000 | 0.500 | 3.000 | 0.004 | — | ○ | X | X | X | ○ | X |

The underlines indicate that the numerical values are out of the ranges of the present invention.

TABLE 3

| Flux material | Formulation ratio |
|---|---|
| Rosin | 42 |
| Glycol-based solvent | 35 |
| Thixotropic agent | 8 |
| Organic acid | 10 |
| Amine | 2 |
| Halogen | 3 |
| Total | 100 |

As shown in Tables 1 and 2, it was found that all the examples had excellent temperature cycle characteristics and an As-concentrated layer, suppressed the thickening or yellowish discoloration of the pastes, and further had excellent wettability. On the other hand, since Comparative Examples 1 to 10 did not satisfy at least one of the requirements of the present invention with all of the alloy compositions, at least one of the evaluation items deteriorated. Since Comparative Examples 1 to 3 and 6 did not contain As, the presence or absence of an As-concentrated layer was not evaluated. In addition, since no heat treatment was conducted in Comparative Examples 11 to 13, it was found that it is impossible to check the concentration of As on surfaces, the thickening of the solder pastes was not suppressed, and the solder alloys turned yellow.

The invention claimed is:

1. A solder alloy consisting of by mass 1.0% to 5.0% of Ag, 0.5% to 3.0% of Cu, 0.5% to 7.0% of Sb, 0.0040% to 0.025% of As, and a balance of Sn, the solder alloy comprising:
   an As-concentrated layer,
   wherein the As-concentrated layer is a region from an outermost surface of the solder alloy to a depth of 2×D1 (nm) in icons of $SiO_2$,
   wherein a thickness of the As-concentrated layer in terms of $SiO_2$ is 0.5 to 8.0 nm,
   wherein S1>S2 where S1 is an integrated value of a detection intensity of As in a region from a depth of 0 to 2×D1 (nm) in terms of $SiO_2$ in a chart of X-ray photoelectron spectroscopy (XPS) analysis and S2 is an integrated value of a detection intensity of As in a region from a depth of 2×D1 to 4×D1 (nm) in terms of $SiO_2$ in a chart of XPS analysis,
   wherein D1 is an initial depth (nm) in terms of $SiO_2$ at which a detection intensity of 0 atoms is ½ a maximum detection intensity (intensity at Do·max) in portion deeper than the depth (Do·max (nm)) in terms of $SiO_2$ at which a detection intensity of 0 atoms is a maximum in a chart of XPS analysis,
   wherein the presence of the As-concentrated layer is confirmed by determination criteria, the determination criteria being:
   in a sample haying a size of 5.0 mm×5.0 mm, an arbitrary area of 700 gm ×300 gm. is selected, and XPS analysis is performed in combination with ion sputtering, one area is selected for each sample, and each of three samples is analyzed once, for a total of three analyses, and
   wherein it is determine that an As-concentrated layer has been formed when S1>S2 in all of the three analyses.

2. A solder paste comprising:
   a solder powder consisting of the solder alloy according, to claim 1; and a flux.

3. A solder ball consisting of the solder alloy according to claim 1.

4. A solder preform consisting of the solder alloy according to claim 1.

5. A solder joint made of the solder alloy according to claim 1.

6. The solder alloy according to claim 1, wherein the content of As is less than or equal to 0.020% by mass.

7. The solder alloy according to claim 1, wherein yellow b* in a L*a*b* color system of the solder alloy is 3.0 to 5.7.

8. The solder alloy according to claim 1, wherein the depth in terms of $SiO_2$ is calculated from spattering time using a sputter-etching rate of an $SiO_2$ standard sample.

* * * * *